H. F. BECHMAN.
INK FOUNTAIN ADJUSTING DEVICE.
APPLICATION FILED JULY 24, 1914.
1,275,642.
Patented Aug. 13, 1918.
8 SHEETS—SHEET 7.
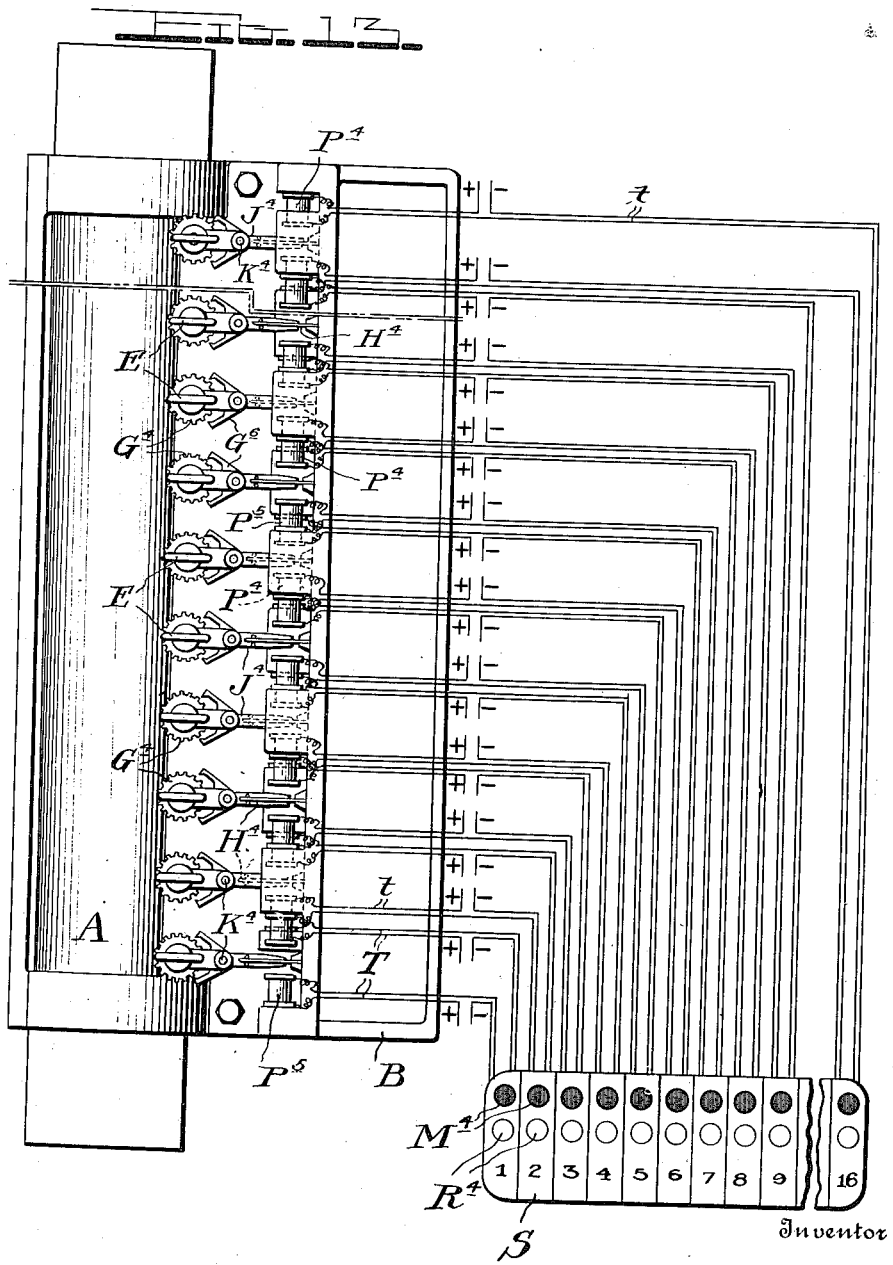

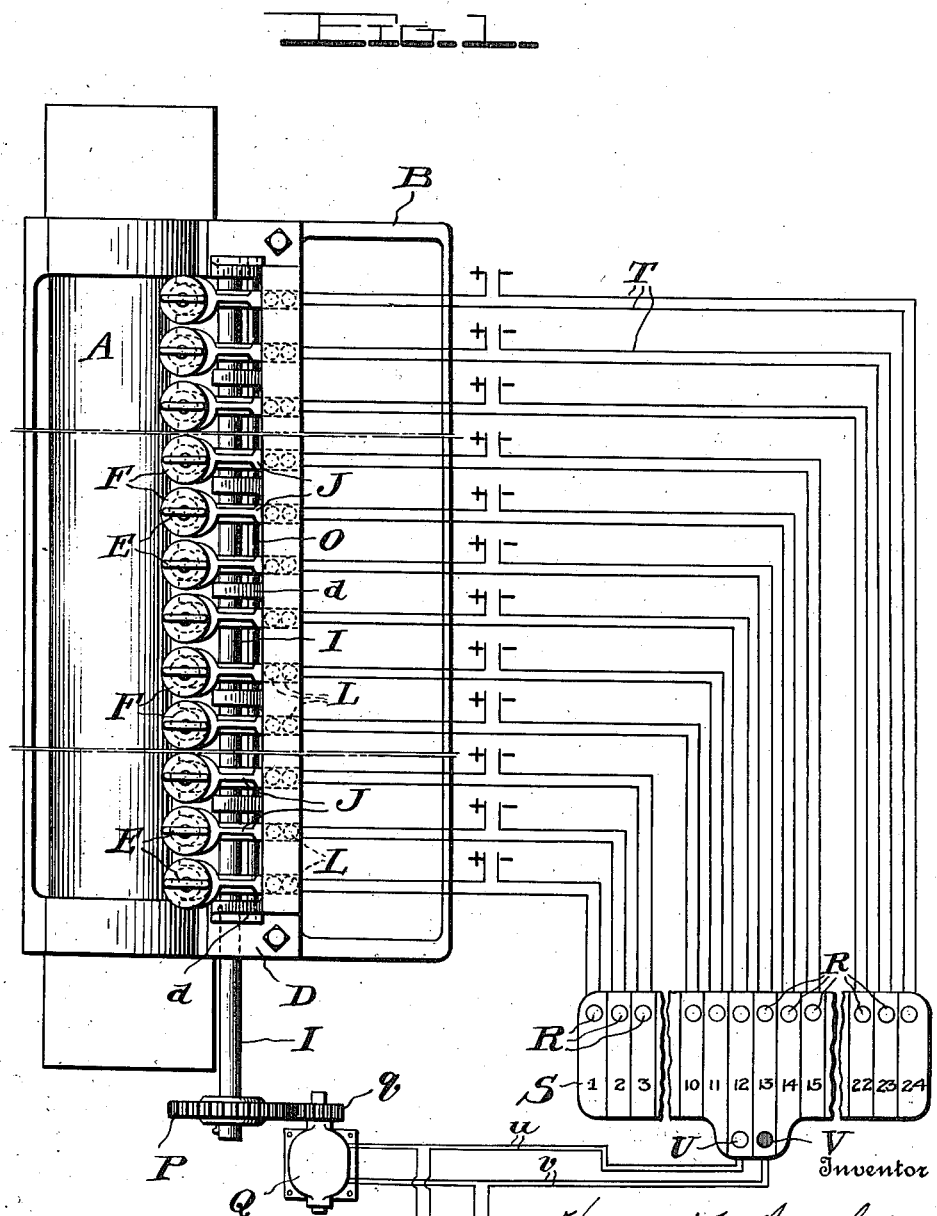

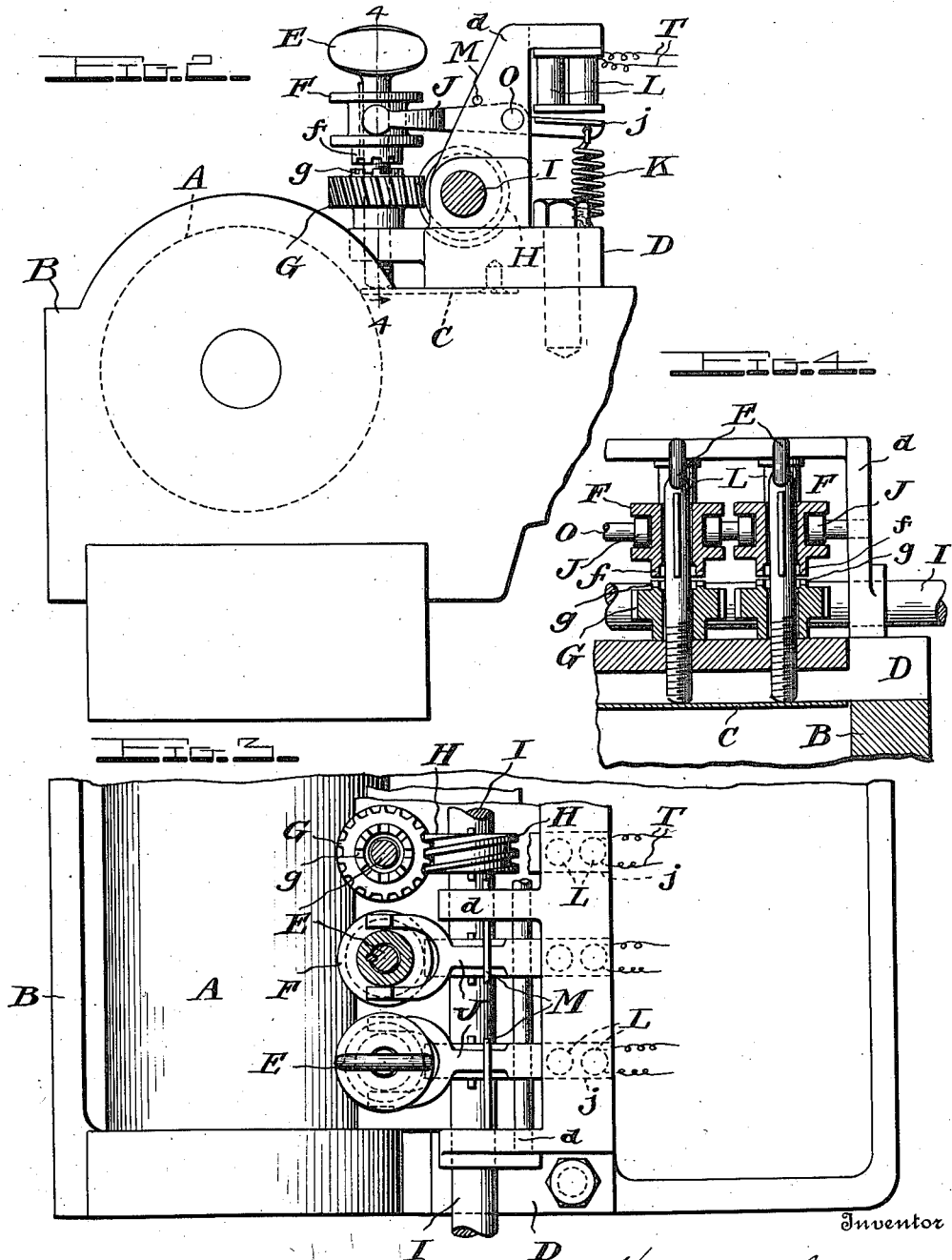

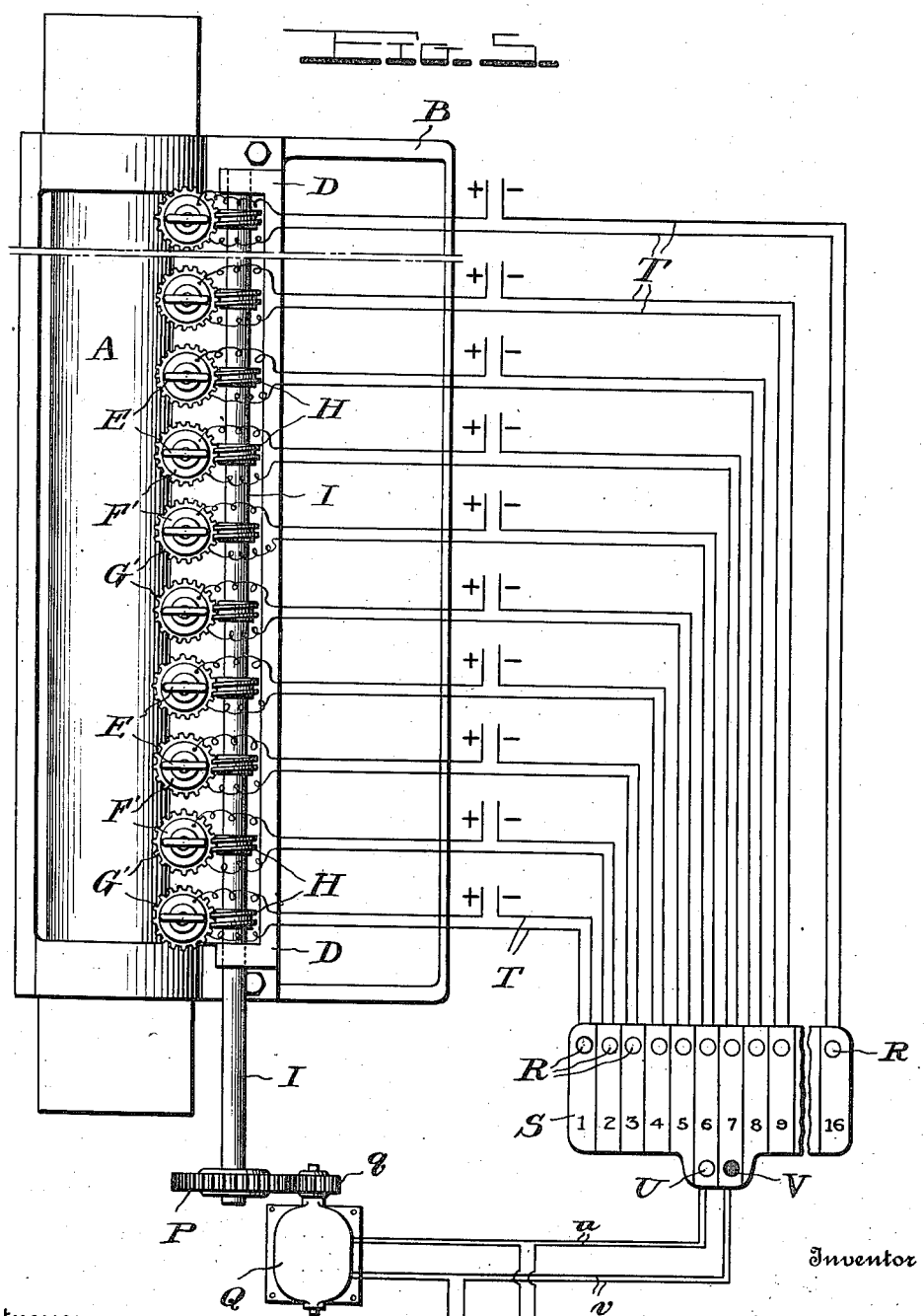

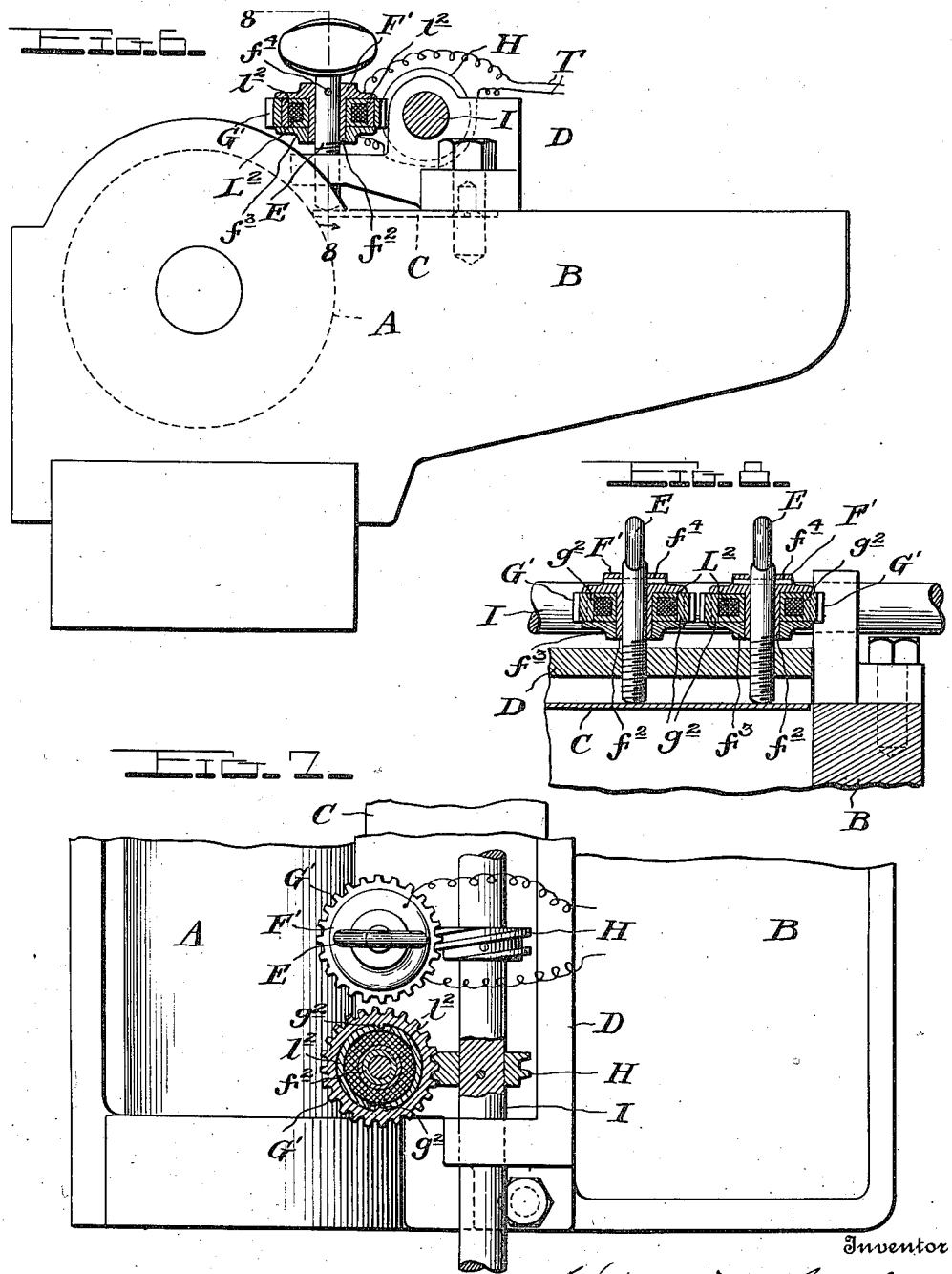

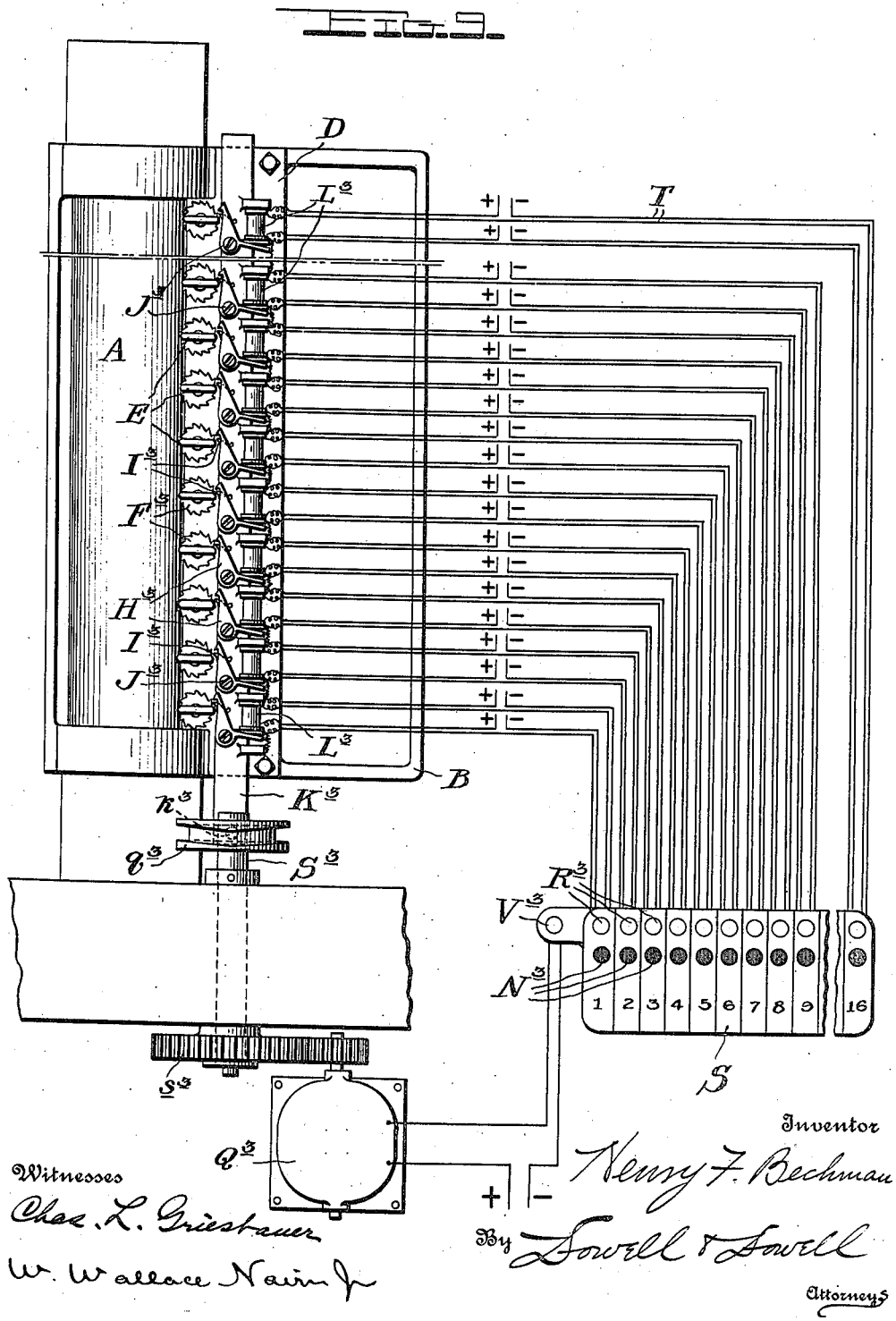

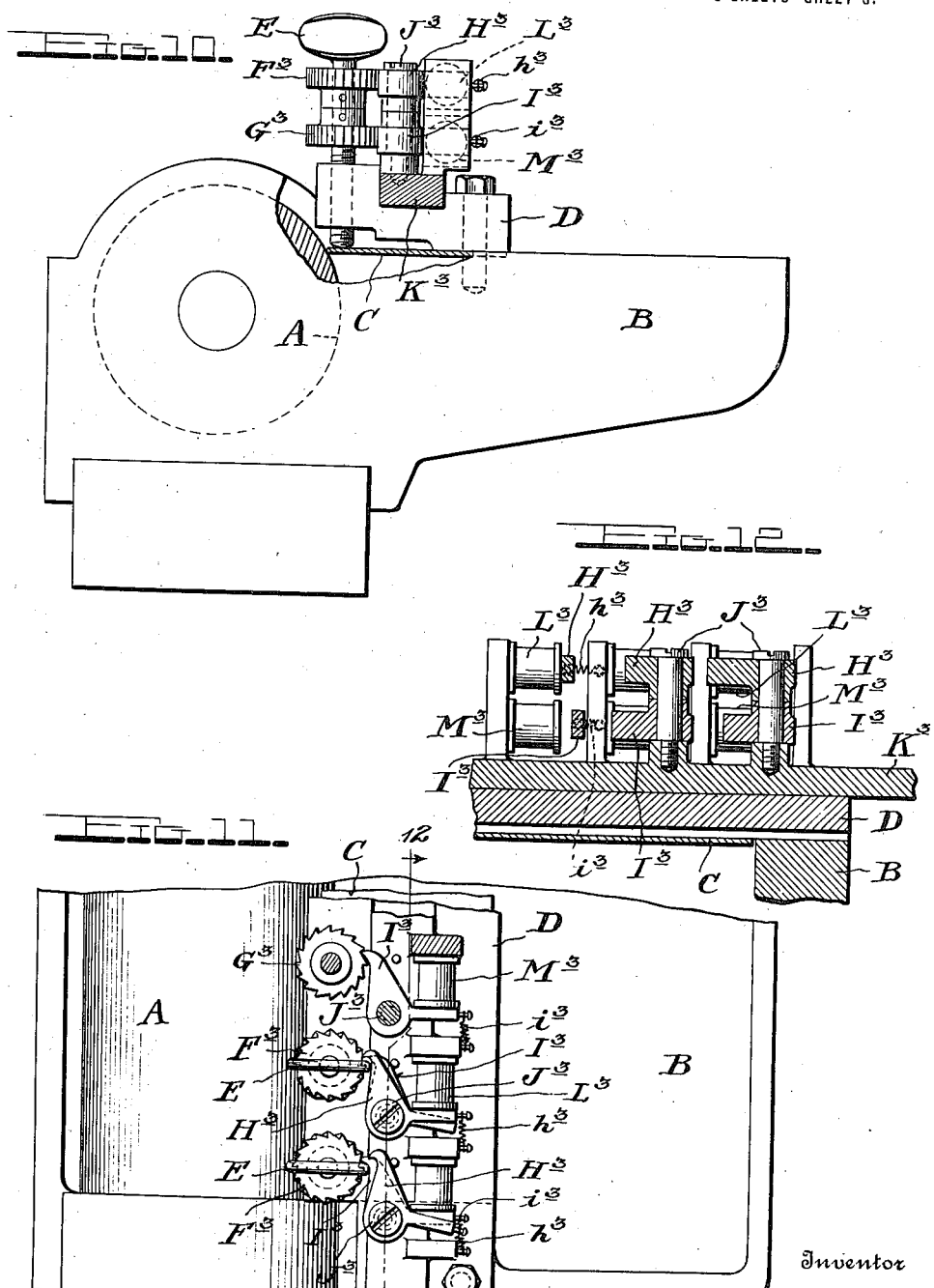

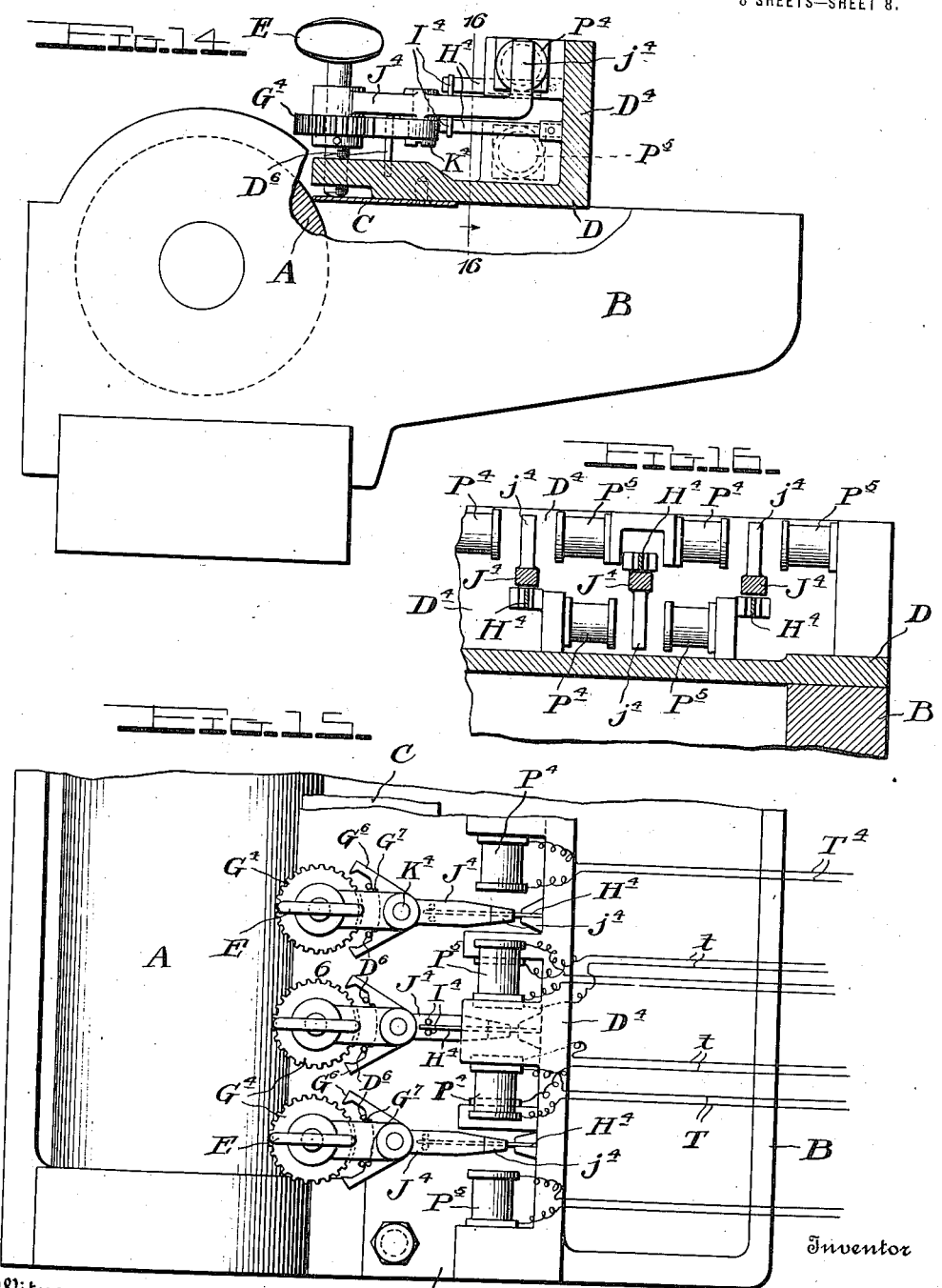

UNITED STATES PATENT OFFICE.

HENRY F. BECHMAN, OF BATTLE CREEK, MICHIGAN, ASSIGNOR TO DUPLEX PRINTING PRESS COMPANY, OF BATTLE CREEK, MICHIGAN, A CORPORATION OF MICHIGAN.

INK-FOUNTAIN-ADJUSTING DEVICE.

1,275,642.  Specification of Letters Patent.  Patented Aug. 13, 1918.

Application filed July 24, 1914. Serial No. 852,840.

*To all whom it may concern:*

Be it known that I, HENRY F. BECHMAN, a citizen of the United States, residing at Battle Creek, in the county of Calhoun and State of Michigan, have invented certain new and useul Improvements in Ink-Fountain-Adjusting Devices; and I hereby declare that the following is a full, clear, and exact description thereof, reference being had to the accompanying drawings, which form part of this specification.

This invention has particular reference to inking mechanisms for large printing presses and other color applying machines, and its major object is to enable the amount of ink supplied from any ink fountain to be controlled by means located at any desired point remote from the fountain; and whereby different amounts of ink may be supplied by the same fountain at different points of its length, and the amount of ink supplied at any desired point in the length of the fountain roll can be increased or diminished at the will of the operator.

The invention is particularly designed for use in web printing machines, and when applied to newspaper presses another object is to enable the ink supplied from any fountain to the form for printing any given column of a newspaper to be increased or diminished at will without having to stop the operation of the machine.

The invention is designed for use with the ordinary type of ink fountains for printing presses in which the amount of ink delivered by the fountain roll is controlled by a scraper blade and the distance, or pressure contact, between the edge of the scraper blade and the periphery of the fountain roll is regulated by screws. Heretofore these screws have been ordinarily manipulated individually by hand, so as to regulate the supply of ink; and in large presses the pressman, in order to adjust the several fountains, had to climb to the different tiers of the press; and sometimes had to stop the press to enable the proper fountain adjustment to be made.

Another object of this invention is to provide means whereby the screws of such fountains can be adjusted individually and mechanically; and another object is to provide electrically controlled means for individually operating the several fountain screws.

My invention more specifically provides means whereby each fountain of a press, or any set of fountains, may be controlled from a central point or switch board, and the operator by simply pressing the proper buttons thereon can increase or diminish the supply of ink obtained from any given fountain, at any point or section in the length of the fountain roll. The controlling devices can be located at any convenient point and in practice would be preferably located where the operator can observe the product of the press and can increase or diminish the supply of ink to any part of the width of the paper, or printed web, as he pleases, without his having to leave the spot; and if the color on the web be too light or too heavy it can be increased or diminished practically instantly without the pressman having to leave his station or climb to upper decks of the press.

With electrically controlled apparatus of this kind, a pressman can have the controller or switch board located near the folder, or any other place he may wish, and the fountain adjustments can all be operated from such board.

Such novel ink control is very desirable and is very convenient especially where the fountains are on large machines having several superposed decks, or where the fountains are placed in inconvenient and inaccessible places, where it would be difficult or inconvenient to make the adjustments by hand.

It will be obvious that the general features of the invention can be embodied in various constructions and I do not consider the invention in its broadest aspect restricted to any specific construction.

In the preferred form of the invention each ink fountain has a series of independent screw operating devices which are preferably electrically controlled; and a controller is provided having a series of switches or push buttons for the corresponding series of screw operating devices. Electrical connections are provided between the push buttons and the related screw operating devices, whereby when the proper push button is operated the related screw will either be tightened or slacked, so as to permit more or less ink to flow out of the fountain and come in contact with the ductor roller. By pressing and releasing the buttons quickly the screws can be adjusted very delicately.

The present preferred construction is that illustrated in Figs. 1 to 4 of the drawings, which will be first described, various other practical constructions are shown merely to illustrate the capability of embodiment of the invention in numerous forms and not to limit it; and the essential features of the invention for which protection is desired are concisely set forth in the claims.

In the drawings:

Figure 1 is a diagrammatic plan view of an ink fountain equipped with novel screw operating devices and electrical controlling means therefor.

Fig. 2 is an enlarged end elevation of the ink fountain and screw operating devices shown in Fig. 1.

Fig. 3 is a plan view of Fig. 2.

Fig. 4 is a section on line 4—4, Fig. 2.

Fig. 5 is a diagrammatic plan view similar to Fig. 1 showing another embodiment of the construction.

Fig. 6 is an end elevation of the ink fountain and screw operating devices shown in Fig. 5.

Fig. 7 is a plan view of Fig. 6.

Fig. 8 is a section on the line 8—8, Fig. 6.

Fig. 9 is a diagrammatic view similar to Fig. 1 showing another embodiment of the invention.

Fig. 10 is an enlarged end elevation partly in section of the fountain and screw adjusting devices shown in Fig. 9.

Fig. 11 is a plan view of Fig. 10.

Fig. 12 is a section on line 12—12 Fig. 11.

Fig. 13 is a diagrammatical plan view showing another embodiment of the invention.

Fig. 14 is an end view partly in section of the fountain and screw adjusting devices shown in Fig. 13.

Fig. 15 is a plan view of Fig. 14.

Fig. 16 is a detail section on line 16—16, Fig. 14.

In the construction illustrated in Figs. 1 to 4 of the drawings, B designates the ink fountain, A the fountain roll, and C the scraper blade which is attached to a top bar D extending across the fountain. Through the upper edge of bar D above the free edge of the blade C are tapped a series of screws E, which are arranged along the length of the blade C, and are independently adjustable, so as to hold the free edge of the blade C more or less closely in relation to, or in contact with, the periphery of the roll A. Preferably blade C is continuous and extends across the entire fountain but is made of a metal flexible enough to allow the screws to slightly vary the contact or distance between its edge and the roll when the screws are adjusted.

The above described parts of the fountain are well known and many of the present used ink fountains are so constructed. Usually the number of screws correspond to the number of ordinary newspaper columns of matter which can be printed side by side at one time by the cylinders of the press. These screws are commonly turned by hand so as to adjust the amount of ink supplied by the fountain to the ductor and through the latter to the inking mechanism. Of course the independent adjustment of these numerous screws is troublesome and requires time; and on large presses where a number of fountains are employed it is a tedious and troublesome task to adjust the different fountains.

In my invention I provide mechanical preferably electrically controlled means for adjusting the screws of any ink fountain from any convenient point of the press as above stated. In the construction shown in Figs. 1 to 4 on each screw E is loosely mounted a worm gear G which is provided with a clutch face $g$ on its side opposite an opposed clutch face $f$ on a collar F which is splined on the screw E as shown, and is normally upheld so as to disengage the clutches $f, g$, by means of a bifurcated lever J which is pivoted at O on a bracket $d$ attached to a bar D; the other end of this lever is connected to one end of a spring K, the other end of which is attached to bar D as shown, said spring normally separates the clutches $f, g$, the separating movement of the clutches being limited by a stop pin M with which lever J contacts.

The lever J has on its rear end an armature $j$ which lies opposite an electro-magnet, or pair of electro-magnets, L which is attached to the upper portion of the bracket $d$ in such position that when these magnets are energized they will attract the armature $j$ thereby overcoming the resistance of spring K and also collar F and engaging clutches $f, g$, thereby locking the gear G to the screw. These magnets L are controlled as hereinafter explained.

The gears G are preferably worm gears and each meshes with a related worm H keyed on a shaft I journaled in the lower portion of the bracket $d$ above the bar D, and extending at one end beyond the end of the fountain. Shaft I carries a gear P meshing with a pinion $q$ on the shaft of an electric motor Q, which may be of any suitable construction.

It will be obvious from the foregoing that if the shaft I be driven and the gear G on any screw be locked to said screw by engagement of the clutch faces $f, g$, said screw will be turned and therefore raised or lowered (according to the rotation of shaft I,) and it will move the adjacent portion of the plate C to or from the roll, the same as if the screw had been adjusted by hand. The motor Q is suitably connected to a source of electrical energy (not shown) so that it can be caused to run in either direction, and rotate shaft I right or left at will. Or an optional construction would be with two motors, one connected to run to the right and the other to the left.

The rotation of the motor and the engagement of clutches $f, g$ of any screw are controlled from a switch board indicated in the drawings at S. This switch board has two push buttons U and V which are connected by wires $u, v$ to the motor Q, and each of said wires is connected in circuit with a suitable source of electrical energy. By pushing button U the electric current is directed through the motor in one direction; and by pushing button V the current is directed through the motor in the opposite direction. It is unnecessary herein to illustrate the electrical connections in detail as they will be varied to suit the press, and will be readily understood and supplied by an electrician; and the specific electrical connections between the push buttons and the motor, and between the push buttons and the magnets, are not claimed herein.

Each magnet, or pair of magnets, L is independently connected by conductors or wires T to an independent push button R on the switch board S. For example, in a large press whose cylinders are designed to print twenty-four newspaper columns and whose ink fountain has twenty-four screws, the switch board S would have twenty-four push buttons R, the switch board being preferably divided into sections corresponding in number with the screws of the related fountain, as indicated by the numerals in Fig. 1. The push button R on each section is connected by wires T to the magnet L controlling the clutch of the related screw. Each set of conductors T is connected to a battery or other suitable source of electricity in a well known manner (not shown) so that when button R is depressed an electrical circuit is established from the battery through the button R, wires T, and connected magnet L; and the latter upon being energized will attract the related armature $j$ and throw the related clutch $f, g$ into mesh, so that the related screw will be operated.

In practice it is not desirable to run the motor Q continuously, and therefore when it is desired to operate any screw I prefer to first push the button R to cause the clutch on the related screw to lock the gear to said screw; and then push button U, or V, to close the circuit through the motor and cause shaft I to rotate in the desired direction, thereby moving the screw up or down, according as desired to have more or less ink supplied at that point. When operated in this manner the clutches are not apt to stick and will disengage as soon as the magnets are deënergized by the release of the button R, which button should be held down until button U, or V, is released.

While I have shown gears G and H as worm gears, other forms of gearing could be used; and it is obvious that the invention is not dependent upon the specific construction of the parts.

In Figs. 5 to 8 I have shown a modification in which the parts lettered similarly to those in Figs. 1 to 4 correspond in construction with similarly lettered parts in said figures. In this modification each screw E is provided with a disk F' having a stem $f^2$ on which is fitted a disk $f^3$ which is secured at $f^4$. Mounted on the sleeve $f^2$ is an electro-magnet $L^2$ and surrounding this magnet and loosely interposed between the disks F' and $f^3$ is an annular gear G'. This gear G' meshes with a worm H on the shaft I. The magnet $L^2$ is fixedly attached or clamped between the disks F' and $f^3$ and the gear G' is simply loosely held around the magnet $L^2$ unless the latter is energized.

Interposed between the periphery of the gear G' and the inner periphery of the magnet $L^2$ and the worm H are armature plates $l^2$ which may be semicircular, and placed on opposite sides of lugs $g^2$ attached to the gear G'. When the magnet $L^2$ is energized, the armatures $l^2$ are attracted and held firmly against the periphery thereof when they then abut against the lugs $g^2$ they cause the screw to turn with the magnet. According to the direction of rotation of the gear G' the screw E is turned right or left, and increases or decreases its pressure on the blade C.

Any suitable magnetic clutch may be used to lock the gear G' to the screw E at will, and any suitable electrical connections may be provided for closing the circuit through the magnet $L^2$ to engage the clutch. As shown, each electro-magnet $L^2$ is connected by conductors T to push-buttons R on the switch board S, and these operate substantially as above explained.

In the constructions shown in Figs. 9 to 15 the screws are individually operated by means of ratchets instead of screws.

The parts A, B, C, D, E, are similar to those above described; but each screw E is provided with a pair of oppositely facing ratchet pinions $F^3$, $G^3$.

The ratchet $F^3$ is adapted to be engaged by a pawl $H^3$ pivoted on a screw $J^3$ attached to a slotted bar $K^3$ extending longitudinally of and guided in a groove in the top of the bar D. The pawl $H^3$ is normally held out of engagement with the gear $F^3$ by means of a spring $h^3$ attached to the tail of the dog and to an adjacent fixed point. The ratchet $G^3$ is engaged by a pawl $I^3$ also pivoted on a stud $J^3$ and normally held out of engagement with the ratchet $G^3$ by a spring $i^3$.

The tail of each pawl forms an armature, and the armature of pawl H³ stands opposite an electro-magnet L³ mounted upon the bar K³; and the armature of the pawl I³ lies opposite a magnet M³ also mounted on the bar K³. Each magnet L³ is connected by suitable conductors to an electric battery or generator and to a push button R³ on a switch board S, as above described; and each magnet M³ is also suitably connected to a source of electricity and to a push button N³ on the switch board.

By pushing a button R³ the related pawl H³ will be thrown into position to engage its related ratchet F³; and by pushing a button N³ its related pawl I³ will be thrown into position to engage its related ratchet G³. A set of push buttons and controlling magnets is provided for each screw E on the fountain.

The bar K³ should be reciprocated longitudinally so as to cause any pawl which is engaged with a ratchet to operate the same; for this purpose I have shown the bar K³ as provided with a pin $k^3$ adapted to engage a grooved cam $q^3$ on a shaft S³ having a gear $s^3$ meshing with a pinion on the shaft of the motor Q³. In this instance the motor need not be reversible, and it is shown as connected with a suitable source of electricity and controlled by a button V³ on the switch board S, in a well known manner.

In this construction when it is desired to operate any screw the related button V³ may be depressed causing the motor to start and reciprocate the bar K³; then the related button R³, or N³, of the screw which it is desired to shift is depressed, according to whether the operator desires to increase or lessen the pressure of such screw on the blade C. In this construction the button R³, or N³, may be depressed before the motor is started in operation.

In the construction shown in Figs. 13 to 16 the parts A, B, C, D and E may be constructed as above described; but on each screw E is fixed a ratchet pinion G⁴ and above this pinion and loosely pivoted on the screw E is a lever J⁴ which projects over the bar D and on its free end has an armature $j^4$ which lies intermediate a pair of magnets P⁴ and P⁵. The lever J⁴ is held normally with its armature intermediate the magnets by means of a spring H⁴ attached to a support D⁴ on the bar D on which the magnets P⁴, P⁵ are also mounted; said spring having its free end engaged between pins I⁴ attached to the lever J⁴, as shown.

A double armed pawl G⁶ is pivotally suspended beneath the lever J⁴ by means of a bolt K⁴, as shown. When the lever J⁴ is in normal position both arms of the pawl G⁶ are disengaged from the related ratchet G⁴ and may be held in this position by means of pins D⁶ attached to the bar D which are engaged by cam projections G⁷ on the pawl G⁶. The construction is such that if the lever J⁴ be swung to the left the right arm of the pawl will engage the ratchet G⁴ and turn the screw to the left while the other arm of the pawl is kept away from the ratchet. If the lever J⁴ be swung to the right, the left arm of the pawl G⁶ will engage the ratchet D⁴ and turn the screw to the right. Of course, when the arm J⁴ is in an intermediate position both arms of the pawl thereon are out of engagement with the related ratchet G⁴.

In order to move each lever J⁴ in either direction I employ two magnets P⁴ and P⁵ for each lever armature. The magnet P⁴ is so arranged that when energized it will attract the adjacent armature $j^4$ and draw same to the left; and the magnet P⁵ when energized will draw the lever J⁴ to the right. Each electro-magnet P⁴ is connected by electrical conductors with a source of electricity, not shown, and with a push button M⁴; and each magnet P⁵ is connected by electrical conductors with a source of electricity, not shown, and a push button R⁴ on the switch board S, substantially as before described.

When a push button M⁴ is depressed the related magnet will be energized and draw the related lever J⁴ to the left, thereby turning the pinion G⁴ and related screw to the left. When a button R⁴ is depressed, the related magnet is actuated and the related lever J⁴ is swung to the right, turning the screw to the right. The extent of rotation imparted to a screw depends upon the number of times the button is depressed. In this way, by pressing the proper buttons, any screw can be turned to left or right, so as to diminish or increase the amount of ink supplied by the fountain roll at this point.

As the screws E are close together to save space the armature $j^4$ of the alternate levers J may project in opposite directions and the pairs of magnets P⁴, P⁵ may be arranged in upper and lower series, as indicated in the drawings.

In the drawings I have simply shown in each instance one fountain and one set of controlling devices but if desired any number of similar fountains provided with such adjusting devices could be simultaneously controlled from one switch board or controlling device, by simply making the proper electrical connections between the switch board and the screw controlling devices of the several fountains; so that by depressing any one button the related screws on any number of fountains could be simultaneously operated. The capability of the invention for application and operation in the manner described will be obvious to those skilled in the art.

A special feature of this construction is that the screws are all operable by hand if desired to do so. When the push buttons are not depressed it is obvious that the gearing or ratchet mechanism is completely out of mesh and the thumb-screw is free for manual operation in any of the constructions shown. Therefore in case of failure of the electric current the fountain adjustments could be made as is now generally customary.

What I claim is:—

1. In combination a fountain having supply regulating devices, electrically controlled means for adjusting the said devices, and means for throwing said electrically controlled means into or out of action located at a point remote from the fountain.

2. In combination a fountain having a series of supply regulating devices; with means for independently adjusting said regulating devices, and means for independently electrically controlling the several adjusting devices from a point remote from the fountain.

3. In combination with an ink fountain having an ink regulating plate and screws for adjusting said plate; of electrically controlled means for independently operating said screws to increase or diminish the amount of ink supplied from the fountain, and means for controlling said electrical means located at a point remote from the fountain.

4. In combination with an ink fountain having adjustable devices for regulating the amount of ink delivered by the fountain, and means for individually operating said devices; with controlling devices located at a point remote from the fountain, and connections between said controlling devices and the several operating means, substantially as described.

5. In combination with an ink fountain, having a series of screws for adjusting the ink supply; of mechanical devices for independently adjusting the screws; electric means for controlling the mechanical devices; and a circuit controller for said electric controlling devices located at a point remote from the fountain.

6. In combination with an ink fountain having a plurality of screws for adjusting the ink supply; of members on the screws for turning the latter, devices beside the screws engaging said members to turn the screws, electrically controlled means for throwing any of said devices into operation, and a series of electric circuit controllers located at a point remote from the fountain, and electrical connections between said circuit controllers and the said electrically controlled means.

7. In combination with an ink fountain having a roll, a scraper plate, and a plurality of screws for adjusting the plate; members on the screws for turning the latter, devices beside the screws engaging said members to turn the screws, a driven shaft for operating the said devices and electrical means for throwing any device into operation.

8. In combination with an ink fountain having a roll, a scraper plate, and a plurality of screws for adjusting the plate; of members on the screws for turning the latter, devices beside the screws engaging said members to turn the screws, an electric motor driven shaft for operating the said means, and a series of push buttons and connections for controlling the operation of the individual screw operating means.

9. In combination, an ink fountain having a roll, a scraper plate, and a series of screws for adjusting said plate and roll; with gears for operating said screws, a motor driven shaft for operating said gears, a clutch for locking each gear to its screw, electro-magnets controlling the clutches, a series of push buttons, and electrical connections between the push buttons and said electro-magnets for individually controlling the clutches.

10. In combination with a fountain roll, scraper, and scraper adjusting screws; of means on the screws for turning them, actuating devices beside each screw engaging the said means, and a mechanism driving all of said actuating devices simultaneously; with a series of push buttons and electrical connections whereby the driving mechanism may be operated at will, and any individual screw actuating device can be set in operation.

11. In combination with an ink fountain having a series of adjusting screws, a gear on each screw, a clutch for locking the gear to the screw, a drive shaft carrying gears meshing with the gears on the screw, means for operating said shaft, and means for throwing the clutch of any screw into engagement with its gear to cause said screw to be operated.

12. In combination, an ink fountain having a series of adjusting screws, a gear on each screw, a clutch for locking the gear to the screw, a drive shaft carrying gears meshing with the gears on the screw, means for operating said shaft, and means for throwing the clutch of any screw into engagement with its gear to cause said screw to be operated; electro-magnets controlling the clutch throwing means, and a series of push buttons and electrical connections whereby said magnets may be controlled from a point remote from the fountain.

13. In combination with an ink fountain having a roll, a scraper, and a series of adjusting screws, a gear on each screw, a clutch for locking the gear to the screw, a drive shaft carrying gears meshing with the gears on the screw, means for operating said shaft, means for throwing the clutch of any screw into engagement with its gear to cause said screw to be operated; and electro-magnets controlling the clutch operating means, a series of push buttons and electrical connections whereby said magnets may be controlled from a point remote from the fountain; an electrical motor for operating said drive shaft, and connections for controlling the operation of said motor.

14. In combination a fountain having supply regulating devices, means for adjusting the said devices, and means for throwing said adjusting means into or out of action located at a point remote from the fountain.

In testimony that I claim the foregoing as my own, I affix my signature in presence of two witnesses.

HENRY F. BECHMAN.

Witnesses:
  I. K. STONE,
  CHAS. A. GRAMES.